Figure 2:
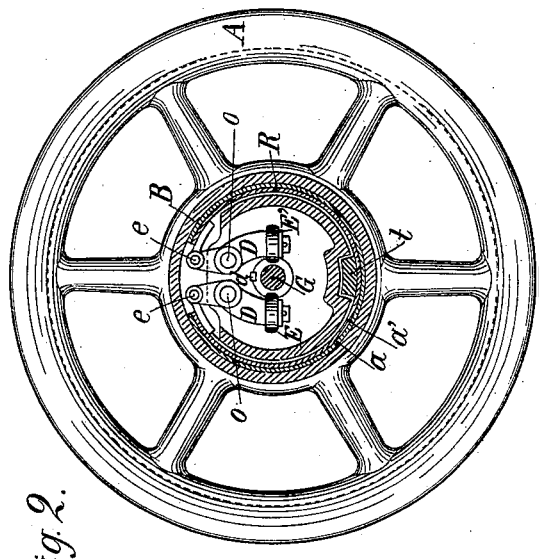

No. 613,702. Patented Nov. 8, 1898.
L. MÉGY.
CLUTCH APPARATUS.
(Application filed Dec. 22, 1897.)

(No Model.) 3 Sheets—Sheet 1.

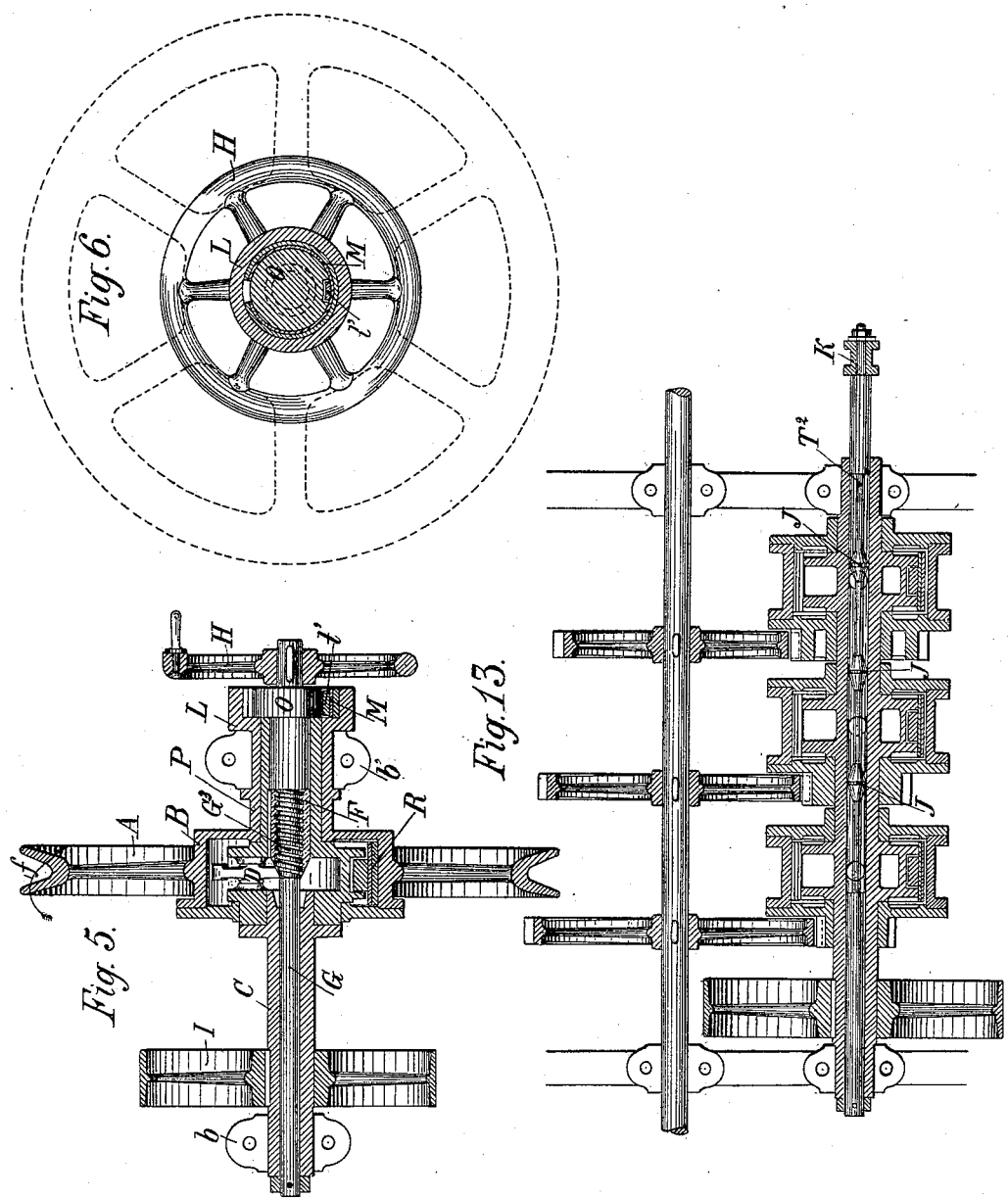

No. 613,702. Patented Nov. 8, 1898.
L. MÉGY.
CLUTCH APPARATUS.
(Application filed Dec. 22, 1897.)
(No Model.) 3 Sheets—Sheet 3.
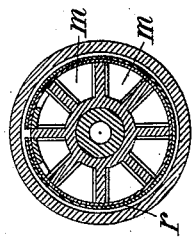
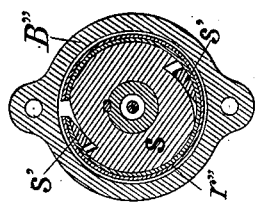
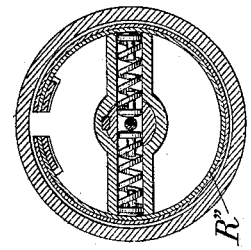
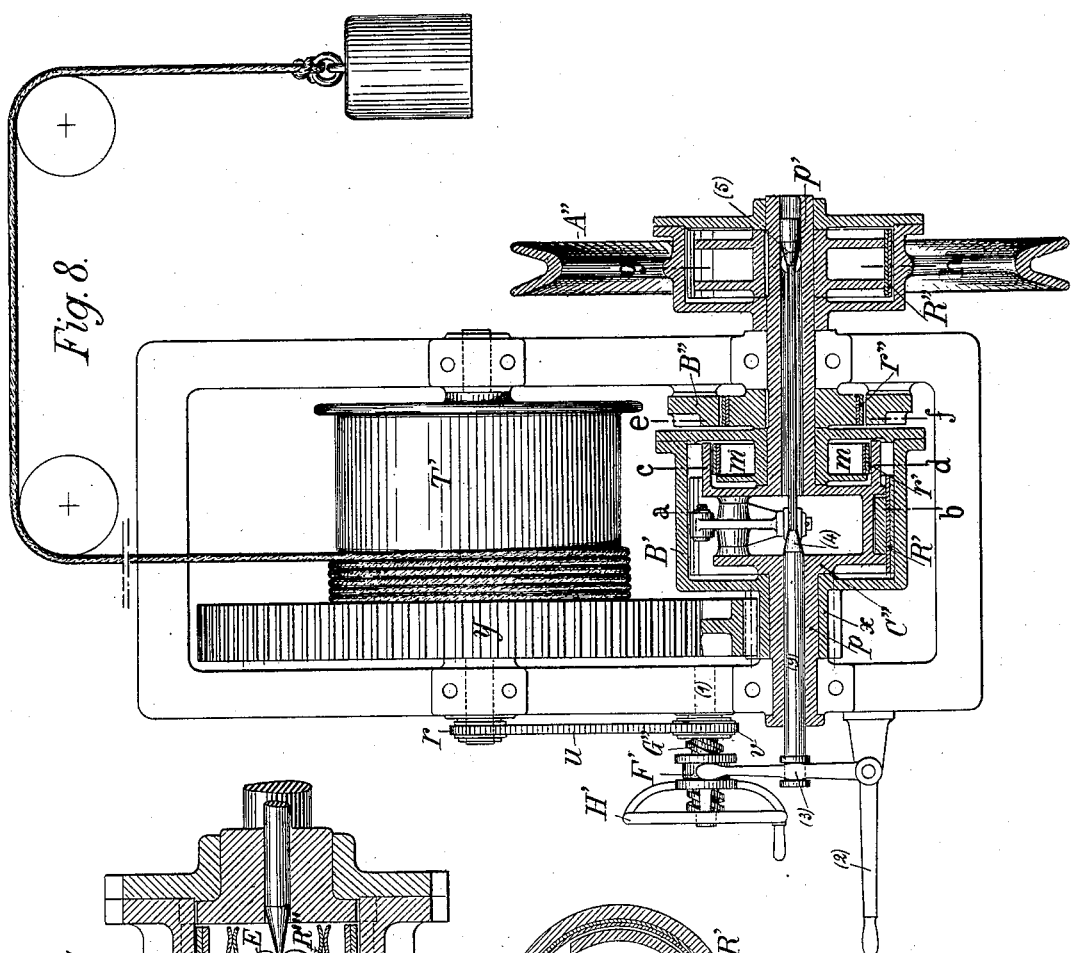
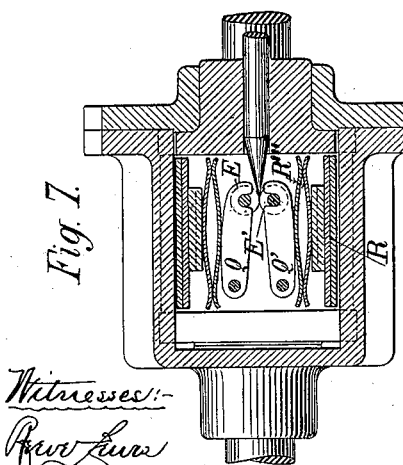

UNITED STATES PATENT OFFICE.

LEANDRE MÉGY, OF PARIS, FRANCE.

CLUTCH APPARATUS.

SPECIFICATION forming part of Letters Patent No. 613,702, dated November 8, 1898.

Application filed December 22, 1897. Serial No. 663,024. (No model.)

*To all whom it may concern:*

Be it known that I, LEANDRE MÉGY, of Paris, in the Republic of France, have invented new and useful Improvements in Clutch Apparatus, which are fully set forth in the following specification, and for which I have obtained patents in Belgium, No. 123,651, dated September 22, 1896; in England, No. 10,000, dated September 22, 1896, and No. 15,728, dated July 1, 1897, and in France, No. 235,882, dated January 29, 1894, and No. 264,989, dated March 15, 1897.

This invention relates principally to friction-clutches of limited power interposed between a part for transmitting power, such as a pulley or toothed wheel, and a part for receiving the said power or a part thereof, the said clutches establishing or breaking the connection between the transmitting part and the receiving part by means of a spring of circular segmental shape, the friction of which acts to connect said transmitting and receiving parts, whereby among the most important advantages attained are suppleness, precision, and safety of action.

The essential part of my improved clutch is therefore a spring of the form of a circular segment, preferably entirely covered with a frictional strip of leather or other suitable frictional material, which is attached to the said steel strip. This spring, which may be an expanding or contracting spring, is fitted either against the smooth cylindrical wall of a box forming one with the power-transmitting part or very close to the said wall. At certain points or at any point on the spring, but preferably at the center, there is fixed a tappet which engages in a notch or groove formed in the periphery of an internal sleeve, which is thereby rendered, as it were, part of the connecting or detaching spring, at the center of which is the said sleeve, whose extensions are carried in bearings and upon whose hub there revolves idly the cylindrical box which forms one with the transmitting part. The sleeve and the box are connected together or placed into gear only when the spring bears or is pressed sufficiently against the wall of the box, so as to produce at that place a desired amount of friction. The spring thus arranged is combined with other parts or devices in the manner hereinafter described, so as to impart to the fullest extent to this kind of clutch the above-mentioned properties. Being always attached to the central sleeve by means of its tappet, it may be detached from the box or be applied thereto by acting in various ways at the end or at the middle of its semicircular branches.

When the spring is an expanding spring and is then applied against the box, its ends are connected to the ends of two small rocking levers, on the other ends of which are arranged rollers between which extends the truncated conical head of a nut that works on the screw-threaded portion of a shaft which can rotate but cannot move longitudinally and upon the outer end of which is mounted an operating hand-wheel that enables the said shaft to be turned by hand, whereby the head of the nut can be caused to enter to a greater or less extent between the rollers. A spring might be interposed between the head of the nut and the rollers for the purpose of rendering the detachment of the spring gentler and more gradual.

If the spring is a contracting spring, then its ends, instead of being pulled together in order to contract the spring, are moved apart in such manner as to extend the spring and to press the strip of leather or other frictional material against the wall of the box when it is desired to throw the apparatus into gear. This is effected in the same manner by means of the nut-head, which also in this case acts against rollers mounted on the ends of suitably-arranged levers, with or without interposed springs, but preferably with springs in front of or behind the rollers in order that the degree of tension or of pressure may be produced more gradually.

In order to obviate the drawbacks resulting from the friction of the parts or from the momentum of the hand-wheel mounted on the shaft that carries the screw-threaded portion on which works the nut with the truncated conical head, both in the case of an expanding spring and in that of a contracting spring, I prolong to one side the hub of the cylindrical box through the supporting-bearing and I make the end thereof to terminate in the form of a basin, on the smooth cylindrical surface of which I apply a small limiting expanding curved spring provided with the ordinary tappet, which engages in a groove formed in the periphery of a disk-shaped shoulder or projection formed on the screw-threaded central shaft, on the end of which the operating hand-wheel is mounted. This small spring has an amount of expansion which is previously determined and is such that it serves as a "*servo-moteur*" for the nut, insuring the transmission of a normal power, but requiring for varying the amount of the power to be transmitted the intervention of the hand on the operating hand-wheel. It acts constantly on the nut to return it to its position of rest as soon as the hand releases the said operating hand-wheel. If the pitch of the screw-threads of the nut and the screw be reversed, then the nut instead of producing disengagement would maintain the engagement, which could only be undone by the action of the operating hand-wheel.

My present invention also embraces the application of said clutch to and improvements in hoisting mechanism, as will be more fully hereinafter described.

The invention will be more fully understood by reference to the accompanying drawings, wherein—

Figure 4:
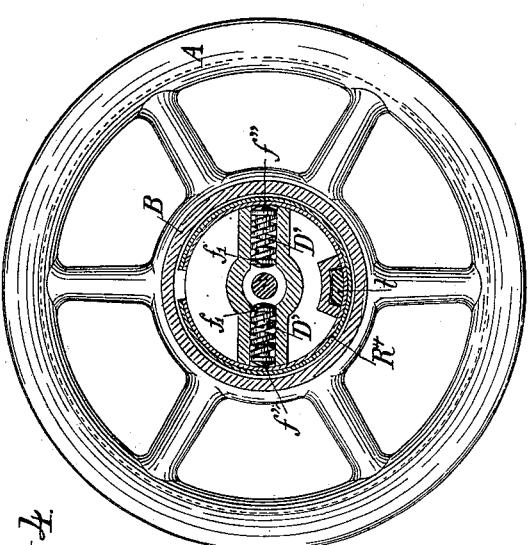
Figure 1:
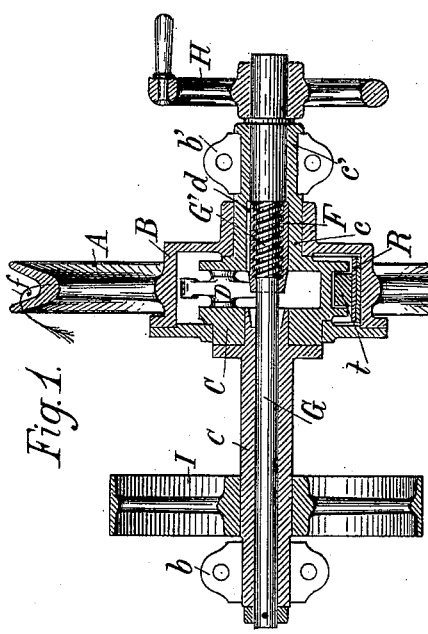
Figure 3:
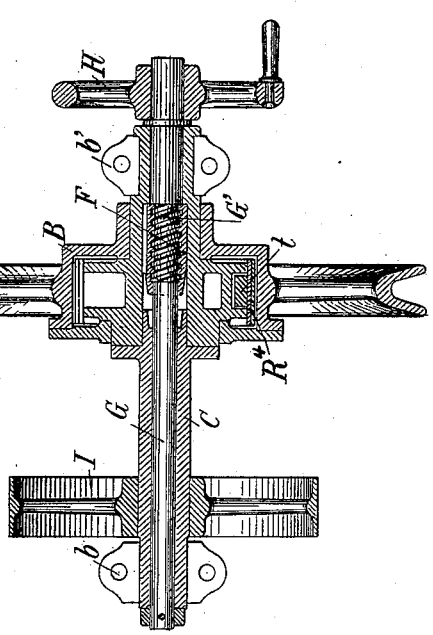

Figure 1 is a longitudinal section along the axis of a clutch constructed in accordance with my invention, the spring in this instance being an expanding spring. Fig. 2 is a cross-section of the same. Fig. 3 is a view similar to Fig. 1 of a clutch having a contracting spring. Fig. 4 is a cross-section of the apparatus shown in Fig. 3. Fig. 5 is a longitudinal view along the axis of a clutch similar to that shown in Fig. 1, with the addition of an expanding-spring clutch for automatically returning the actuating-nut to its normal position when the operator releases the handle. Fig. 6 is a transverse sectional view of the apparatus shown in Fig. 5. Fig. 7 is a horizontal section above the axis of a clutch-box, showing the manner in which a rod sliding laterally on the shaft and ending in a beveled part acts upon levers behind which are leaf-springs that transmit their force to the contracting spring R. Fig. 8 is a vertical sectional view, partly in elevation, of a hoisting apparatus constructed in accordance with my invention. Figs. 9, 10, 11, and 12 are cross-sections on the lines $a\,b$, $c\,d$, $e\,f$, and $g\,h$, and Fig. 13 is a longitudinal section showing a group of three clutches adapted to successively impart different speeds to the shaft to be driven.

Referring first to Figs. 1 and 2, A represents a driving-pulley rotating in the direction indicated by the arrow $f$. The center or hub of this pulley is hollowed out in the form of a cylindrical box B, which rotates loosely on an internal sleeve C, having hollow extensions $c\,c'$ and connected to the said box by means of the spring R, which is in the form of a circular segment composed of two leaves— one, $a$, of steel, to which is attached at any point, but preferably at the center, a tenon $t$, the other, $a'$, of leather or other suitable material, forming one with the leaf $a$. Upon one of the extensions of the sleeve C, in which the spring R is maintained by the tappet $t$, there is keyed the part I (which may be a pulley or a toothed wheel) for receiving the power transmitted by the clutch.

A central shaft G extends through the sleeve C and its extensions, which latter are supported in bearings $b$ and $b'$. Shaft G, which rotates freely in the sleeve, but without being capable of moving longitudinally, is provided with screw-thread G', which forms one therewith and on which works a nut F, having a truncated conical point. This nut is kept in place by a longitudinal pin or spline $d$, fixed in the internal bore of the sleeve C, which causes the nut F to be carried along by the rotary motion of the sleeve C and at the same time allows the nut to slide longitudinally when caused to do so by the rotary motion imparted to the central shaft G either by means of the operating hand-wheel H, mounted on its outer end, or by other means. The screw-thread G', the nut F, and the hand-wheel H together constitute a *servo-moteur*.

When the spring R of the clutch is an expanding one, as in Figs. 1 and 2, the truncated conical point of the nut F, when the latter is pushed along in consequence of the rotary motion imparted to the hand-wheel H, enters between the rollers E E', which are each mounted on the end of one of the two levers D D, pivoted at $o\,o$, the other ends $e\,e$ of these levers being attached, respectively, to the corresponding ends of the spring R, drawing the ends of spring R together, contracting the same and throwing the clutch out of action.

When the spring $R^4$ is a contracting spring, as shown in Figs. 3 and 4, said spring must in the action of the clutch be expanded. To this end the nut F is arranged to act upon head $f''\,f'$, carried by springs D' D', which on being compressed act against heads $f''\,f''$, which latter bear with yielding pressure against the spring R to open it outwardly and gradually press it against the inner surface of the box B, and thus produce friction proportionate to the power to be transmitted.

The compression-spring may also be opened out by the arrangement shown in Fig. 7, where the edge of a lateral or central sliding rod, ending in a beveled part, enters between two rollers E E', arranged at the ends of the levers Q Q' and acting upon the ends of the compression-spring $R^4$ through the medium of leaf-springs $R'''$.

In the case of a clutch having an expansion-spring, Figs. 1 and 2, as also in that of a clutch having a contracting spring, Figs. 3 and 4, the operations can only be effected in a precise and certain manner so long as the hand-wheel H, which operates the shaft G, provided with the screw G', is constantly worked or held by hand. This hand-wheel, if it were left to itself, might, under the action of the friction of the parts or of their inertia, move automatically, and thus cause disturbances in the precision of the operations. In order to obviate this drawback and return the nut to its normal position when the hand-wheel is left to itself, I have devised the arrangement shown in Fig. 5. The hollow hub of the box B, forming one with the pulley A, is prolonged through and to the outside of the bearing $b'$, where it ends in a basin L, provided internally with an expansion-spring M, similar to the expanding spring above described. This spring carries fixed to its center a tappet $t'$, which engages in a notch formed in the periphery of the disk-like internal shoulder O, made in one with the shaft G and the screw $G^3$, which is moved by it in its rotary motion. It will be seen that the frictional action of spring M against the basin L acts constantly, through the medium of the disk O, to return the nut F to its normal or rest position as soon as the operating hand-wheel H is left to itself. It is only when the hand-wheel is held firmly that sliding can take place between the basin L and the spring M. The result of the operations would be reversed if the thread of the screw G were reversed.

In Figs. 8 to 12, inclusive, I have shown both the expanding and the contracting spring clutches applied to a hoisting apparatus or windlass for transmitting power to the drum thereof and for disconnecting the power-transmitting means from the drum to permit the lifted load to descend, a suitable automatically-operating brake being also provided for checking the too-rapid descent of the load. Referring particularly to Fig. 8, F′ represents a nut provided with a hand-wheel H′ and engaging a hollow screw G″, formed in one with a sprocket-wheel $v$, connected with a sprocket-wheel $r$ on the end of the shaft of drum T′ by a sprocket-chain $u$. The hollow screw G″ and the sprocket-wheel $v$ rotate on an axle 1, fixed to and projecting from the framework. Nut F′ is circular and has a groove extending around its periphery, in which engages the fork of an operating-lever 2, said lever also engaging a peripheral groove in a sliding rod 9 at the point 3. Said rod is formed with tapering shoulders 4 and 5, the purpose of which will be more fully described hereinafter. C″ is a hollow shaft having extensions $p$ and $p'$ bearing in the framework. The extension $p'$ projects outside of the framework and has mounted thereon the driving-pulley A″ and is adapted to be connected to and disconnected from the shaft by means of a contracting spring R″, (see Fig. 12,) adapted to be thrown into action by inclined shoulder 5 of rod 9 in the manner described with reference to the apparatus illustrated in Figs. 3 and 4. B′ is a cup-shaped casing bearing on the shaft C″ and having a pinion $x$, formed integral therewith and engaging large gear-wheel $y$ on the drum T′. The portion of shaft C″ within the casing B′ is enlarged and carries an expanding-spring clutch R′ (see Fig. 9) for connecting it with said drum. The inclined shoulder 4 on rod 9 acts against levers D D to contract spring R and throw the clutch out of action, as already described with reference to the apparatus shown in Figs. 1 and 2. The cup-shaped casing B′ is also provided with a number of weights $m$ (see Fig. 10) in suitable radially-disposed ways and acting by centrifugal force to press a contracting spring $r$ into frictional contact with an overhanging annular flange on shaft C″. (See Fig. 8.) A pawl mechanism having spring-pawls $s'$ $s'$ is keyed on the extension $p'$ of shaft C″ according to the direction of rotation of said shaft and a pawl-plate $s$, secured thereto. The spring $r''$, which carries the pawls $s'$ $s'$, is opened and forced into frictional contact with the interior wall of a ring B″, fixed to the framework, thus acting as a brake; or when the shaft C″ rotates in the opposite direction the pawls rotate with the shaft, assuming the position shown in Fig. 11, and offer no resistance thereto.

The operation of the hoisting apparatus or windlass is as follows: As shown in Fig. 8, the pulley A″ is disconnected from shaft C″ and the mechanism is at rest. To throw the windlass into operation to lift the load, the operator, who has one hand on lever 2 and the other on hand-wheel H′, turns the latter, causing nut F′ to move on screw G″ (the latter being at rest) to the left, Fig. 8, thus moving rod 9, causing inclined shoulder 5 to throw clutch R″ into action and shoulder 4 to throw clutch R′ into action, rotating cup-shaped casing B′, pinion $x$, gear $y$, and drum T′, which winds up the cable attached to the load. During this lifting of the load the operator releases his hold on hand-wheel H′, but holds lever 2, thus preventing movement of nut F′ along screw G″, with which it rotates. After the load has been lifted the desired distance the hand-wheel H′ is turned to move the nut F′ to the right, Fig. 8, thereby moving the rod 9, gradually throwing clutches R′ and R″ out of action, and allowing the load to descend. Should the descent of the load become too rapid, the action of the weights $m$ $m$ and spring $r$ will rotate shaft C″, and the cam $s$, being thus rotated to the left, Fig. 11, will throw spring $r''$ into frictional contact with ring B″ and act to brake the rotation of shaft C″, and consequently check the descent of the load.

Having now particularly described and ascertained the nature of the said invention and in what manner the same is to be performed, I declare that what I claim is—

1. In a clutch apparatus, the combination with a driving-wheel having a chamber therein of circular interior contour, of a shaft to be driven, a leaf-spring in the form of an arc connected with the shaft so as to rotate therewith, said spring being located in the chamber of the driving-wheel and adapted to bear against the inner wall thereof in the action of the clutch, and means for moving the ends of the spring with relation to each other and against the tension of the spring, substantially as described.

2. In a clutch apparatus, the combination with a driving-wheel having a chambered hub, said chamber being of circular interior contour, of a shaft to be driven, a leaf-spring in the form of an arc connected with the shaft so as to rotate therewith, said spring being located in the chambered hub of the driving-wheel, and adapted to bear against the inner wall thereof in the action of the clutch, an auxiliary shaft having a screw-thread thereon and provided with means—such as a hand-wheel—for rotating the shaft, a tapered nut engaging the screw-thread on the auxiliary shaft, a connection—such as levers—through which the tapered nut acts to vary the diameter of the arc of the spring against the tension thereof, substantially as described.

3. In a clutch apparatus, the combination with a driving-pulley having an elongated hollow hub with enlarged chambers at opposite ends thereof, of a hollow shaft to be driven passing through said hub, a leaf-spring in the form of an arc connected so as to rotate with the hollow shaft, said spring being located in and adapted to engage with the inner wall of the chamber at one end of the hub in the action of the clutch, an auxiliary shaft extending longitudinally through the hollow shaft and carrying at one end means—such as a hand-wheel—for rotating the shaft, a tapered nut engaging a screw-thread on the auxiliary shaft and keyed to the hollow shaft so as to rotate therewith but be free to move longitudinally thereof, connections—such as levers—with the leaf-spring, against which the tapered nut acts to vary the diameter of said spring against its tension, a second leaf-spring in the form of an arc connected with the auxiliary shaft so as to rotate therewith, located within and pressing by its tension against the inner wall of the chamber at the other end of the pulley-hub, substantially as described.

4. In a clutch and brake apparatus for windlasses and the like, the combination with a constantly-rotating driving-pulley, a shaft to be driven by said pulley and on which the latter engages, a cup-shaped casing to which motion is communicated from the shaft, and a winding-drum geared to said cup-shaped casing, of a spring-clutch between the driving-pulley and the shaft to be driven disconnecting said parts in its normal position, a second spring-clutch between the shaft and the cup-shaped casing normally connecting said parts, a third spring-clutch carried by the cup-shaped casing and acting automatically by the centrifugal action of suitable weights to connect said casing with the shaft, and a brake device carried by the shaft and acting automatically upon a suitable fixed part of the framework or the like to check or stop the rotation of the parts on the unwinding of the drum and the descent of the load lifted by the windlass, and means under control of the operator for throwing the spring-clutches between the driving-pulley and the shaft and the shaft and the cup-shaped casing into and out of operation respectively as desired, substantially as described.

In testimony whereof I have signed this specification in the presence of two subscribing witnesses.

LEANDRE MÉGY.

Witnesses:
EDWARD P. MACLEAN,
EDWARD BEUGUIRT.